United States Patent
Endo et al.

(10) Patent No.: US 10,179,544 B2
(45) Date of Patent: Jan. 15, 2019

(54) VEHICLE EXTERIOR OBSERVATION DEVICE AND IMAGING DEVICE

(71) Applicant: KOITO MANUFACTURING CO., LTD., Tokyo (JP)

(72) Inventors: Osamu Endo, Shizuoka (JP); Naoki Tatara, Shizuoka (JP)

(73) Assignee: KOITO MANUFACTURING CO., LTD., Tokyo (JP)

( * ) Notice: Subject to any disclaimer, the term of this patent is extended or adjusted under 35 U.S.C. 154(b) by 137 days.

(21) Appl. No.: 15/314,189

(22) PCT Filed: May 20, 2015

(86) PCT No.: PCT/JP2015/064510
§ 371 (c)(1),
(2) Date: Nov. 28, 2016

(87) PCT Pub. No.: WO2015/182457
PCT Pub. Date: Dec. 3, 2015

(65) Prior Publication Data
US 2017/0217369 A1    Aug. 3, 2017

(30) Foreign Application Priority Data

May 29, 2014    (JP) .................................. 2014-110738
May 29, 2014    (JP) .................................. 2014-110739

(51) Int. Cl.
*H04N 7/00*    (2011.01)
*B60R 1/00*    (2006.01)
(Continued)

(52) U.S. Cl.
CPC .............. *B60R 1/00* (2013.01); *B60Q 1/0023* (2013.01); *B60R 21/00* (2013.01);
(Continued)

(58) Field of Classification Search
CPC ................ B60R 1/00; B60R 2300/802; B60R 2300/8066; B60R 2300/105;
(Continued)

(56) References Cited

U.S. PATENT DOCUMENTS

2010/0277935 A1    11/2010    Endo et al.
2011/0242320 A1    10/2011    Yamada et al.
(Continued)

FOREIGN PATENT DOCUMENTS

CN            102205811 A      10/2011
EP            2 623 374 A1      8/2013
(Continued)

OTHER PUBLICATIONS

Comms. dated Aug. 4, 2015 issued by the Int. Searching Authority in Application No. PCT/JP2015/064510 (PCT/ISA/210 & PCT/ISA/237).
(Continued)

*Primary Examiner* — Robert Chevalier
(74) *Attorney, Agent, or Firm* — Sughrue Mion, PLLC (57) ABSTRACT

A vehicle exterior observation device is provided with imaging devices (1L, 1R) and an image control unit (2). The imaging devices (1L, 1R) are each provided with: an imaging element (13) having an imaging surface; a first image-producing optical system (14t) configured so as to form, on the imaging surface, a first image of a first imaging area (13t) of the vehicle exterior at a first imaging magnification; and a second image-producing optical system (14w) configured so as to form, on the imaging surface, a second image of a second imaging area (13w) of the vehicle exterior at a second imaging magnification different from the first imaging magnification. The image control unit (2) is configured so as to detect the first imaging area (13t) and the second imaging area (13w), synthesize the first image and the
(Continued)

second image on the basis of the detected first imaging area and second imaging area so that the first image and the second image are displayed in succession, and display the synthesized images on monitors (3L, 3R).

13 Claims, 9 Drawing Sheets

(51) Int. Cl.
| | | |
|---|---|---|
| *B60R 21/00* | (2006.01) | |
| *H04N 7/18* | (2006.01) | |
| *B60Q 1/00* | (2006.01) | |
| *H04N 5/232* | (2006.01) | |
| *H04N 5/247* | (2006.01) | |
| *H04N 5/265* | (2006.01) | |
| *B60Q 1/26* | (2006.01) | |
| *B60Q 1/34* | (2006.01) | |

(52) U.S. Cl.
CPC ..... *H04N 5/23238* (2013.01); *H04N 5/23293* (2013.01); *H04N 5/23296* (2013.01); *H04N 5/247* (2013.01); *H04N 5/265* (2013.01); *H04N 7/18* (2013.01); *B60K 2350/106* (2013.01); *B60K 2350/2013* (2013.01); *B60Q 1/2696* (2013.01); *B60Q 1/34* (2013.01); *B60R 2300/105* (2013.01); *B60R 2300/303* (2013.01); *B60R 2300/306* (2013.01); *B60R 2300/802* (2013.01); *B60R 2300/8066* (2013.01)

(58) Field of Classification Search
CPC ........ B60R 2300/303; B60R 2300/306; B60Q 1/0023; B60Q 1/34; H04N 5/23238; H04N 5/265; H04N 5/23293; H04N 5/23296; H04N 5/247; B60K 2350/106; B60K 2350/2013

USPC ...................... 348/38, 39, 36, 42, 61, 47, 51
See application file for complete search history.

(56) References Cited

U.S. PATENT DOCUMENTS

2014/0132770 A1    5/2014  Lee et al.
2016/0350974 A1*  12/2016  Hashimoto ............... B60R 1/00

FOREIGN PATENT DOCUMENTS

| EP | 2 642 750 A2 | 9/2013 |
|---|---|---|
| FR | 2 947 780 A1 | 1/2011 |
| JP | 8-9362 A | 1/1996 |
| JP | 11-205664 A | 7/1999 |
| JP | 2000-177483 A | 6/2000 |
| JP | 2001-257923 A | 9/2001 |
| JP | 2003-116029 A * | 4/2003 |
| JP | 2004-194169 A | 7/2004 |
| JP | 2007-131162 A | 5/2007 |
| JP | 2007-174097 A | 7/2007 |
| JP | 2008-22125 A | 1/2008 |
| JP | 2013-009065 A | 1/2013 |
| JP | WO 2014/156786 A1 * | 10/2014 |

OTHER PUBLICATIONS

Communication issued by the European Patent Office dated Feb. 20, 2018 in counterpart European Patent Application No. 15799505.1.
Communication issued by the Japanese Patent Office dated Dec. 12, 2017 in counterpart Japanese Patent Application No. 2014-110739.
Communication dated Mar. 6, 2018, issued by the Japanese Patent Office in counterpart Japanese application No. 2014-110739.
Communication dated May 17, 2018, issued by the State Intellectual Property Office of P.R. China in counterpart Chinese application No. 201580028262.1.

* cited by examiner

VEHICLE EXTERIOR OBSERVATION DEVICE AND IMAGING DEVICE

TECHNICAL FIELD

The present invention relates to a vehicle exterior observation device configured to observe an exterior of a vehicle such as an automobile and an imaging device provided for the exterior observation device.

RELATED ART

In order to observe rear and side areas of an automobile exterior, a vehicle exterior observation device configured to capture the areas with an imaging device and to display the captured images on a monitor of a vehicle interior has been suggested. The vehicle exterior observation device is provided, so that it is possible to omit left and right side-view mirrors of the automobile, which is advantageous to a design of the automobile or to reduce an air resistance during traveling of the automobile. Patent Document 1 discloses a technology of disposing cameras configured to image the rear and side areas in winker lenses (side turn signal lamps) provided at both left and right side positions of a front bumper of the automobile or at left and right front fenders and displaying images captured with the cameras on a monitor provided at a driver seat in the vehicle interior.

CITATION LIST

Patent Documents

Patent Document 1: Japanese Patent Application Publication No. 2000-177483A
Patent Document 2: Japanese Patent Application Publication No. 2007-131162A

SUMMARY OF THE INVENTION

Problems to be Solved

According to the technology of Patent Document 1, since the cameras disposed at the left and right sides of the automobile have a structure using an optical system (lens system) of a single focusing distance, respectively, an imaging area (imaging view angle) is determined by the optical system. That is, cameras configured by an optical system having a narrow view angle cannot capture wide rear and side areas of the automobile, so that a so-called dead zone occurs. On the other hand, a camera configured by an optical system having a wide view angle is effective to remove the dead zone because it captures a wide range. However, since an observation target, for example, other vehicle, which exists around an own vehicle, is captured as a small image, if the captured image is displayed on the monitor, as it is, it is difficult to clearly recognize the other vehicle. In particular, when a small imaging element is used so as to make the camera small, the number of pixels constituting an imaging surface is limited, so that it is difficult to obtain an image of a high resolution.

Therefore, it is considered to use cameras having wide and narrow view angles in combination. In this case, however, the number of cameras increases, the arrangement of the cameras on the automobile is difficult and the cost increases. Patent Document 2 discloses a technology of disposing two image-producing optical systems having different imaging optical axis directions for one imaging element and using the two image-producing optical systems to capture different areas with one imaging element. According to the technology of Patent Document 2, it is possible to capture and observe a plurality of (two) different areas at the same time without increasing the number of cameras. However, it is required to set the two imaging areas with being spaced from each other so as to widen the imaging view angle, so that it is not possible to observe a wide area in which the two imaging areas are continuous. Therefore, it is difficult to avoid the dead zone. Also, even when the observation area is enlarged, it is not possible to increase the resolution due to the limit on the number of pixels of the imaging element, so that it is difficult to obtain a clear image, which is the same as Patent Document 1.

It is therefore an object of the present invention to provide a vehicle exterior observation device capable of displaying a plurality of images in succession, which are to be obtained by capturing different areas, and zooming in an observation target, and an imaging device provided for the vehicle exterior observation device.

Means for Solving the Problems

According to a first aspect of the present invention, there is provided a vehicle exterior observation device including an imaging device and an image control unit. The imaging device includes an imaging element having an imaging surface, a first image-producing optical system configured to form, on the imaging surface, a first image of a first imaging area of a vehicle exterior at a first imaging magnification, and a second image-producing optical system configured to form, on the imaging surface, a second image of a second imaging area of the vehicle exterior at a second imaging magnification different from the first imaging magnification. The image control unit is configured to detect the first imaging area and the second imaging area, to synthesize the first image and the second image on the basis of the detected first imaging area and second imaging area so that the first image and the second image are displayed in succession, and to display the synthesized image on a monitor.

According to a second aspect of the present invention, there is provided an imaging device provided for a vehicle exterior observation device configured to observe a vehicle exterior on the basis of an image of the vehicle exterior. The imaging device includes an imaging element having an imaging surface, a first image-producing optical system configured to form, on the imaging surface, a first image of a first imaging area of the vehicle exterior at a first imaging magnification, and a second image-producing optical system configured to form, on the imaging surface, a second image of a second imaging area of the vehicle exterior at a second imaging magnification different from the first imaging magnification.

Effects of the Invention

According to the present invention, the targets such as other vehicles outside the own vehicle are captured with being zoomed in. Thereby, it is possible to correctly recognize the targets and to prevent a dead zone from occurring over a wide area of the exterior of the own vehicle. In this way, it is possible to secure the safe traveling while observing the targets around the own vehicle.

DETAILED DESCRIPTION OF ILLUSTRATIVE EMBODIMENTS

Figure 1:
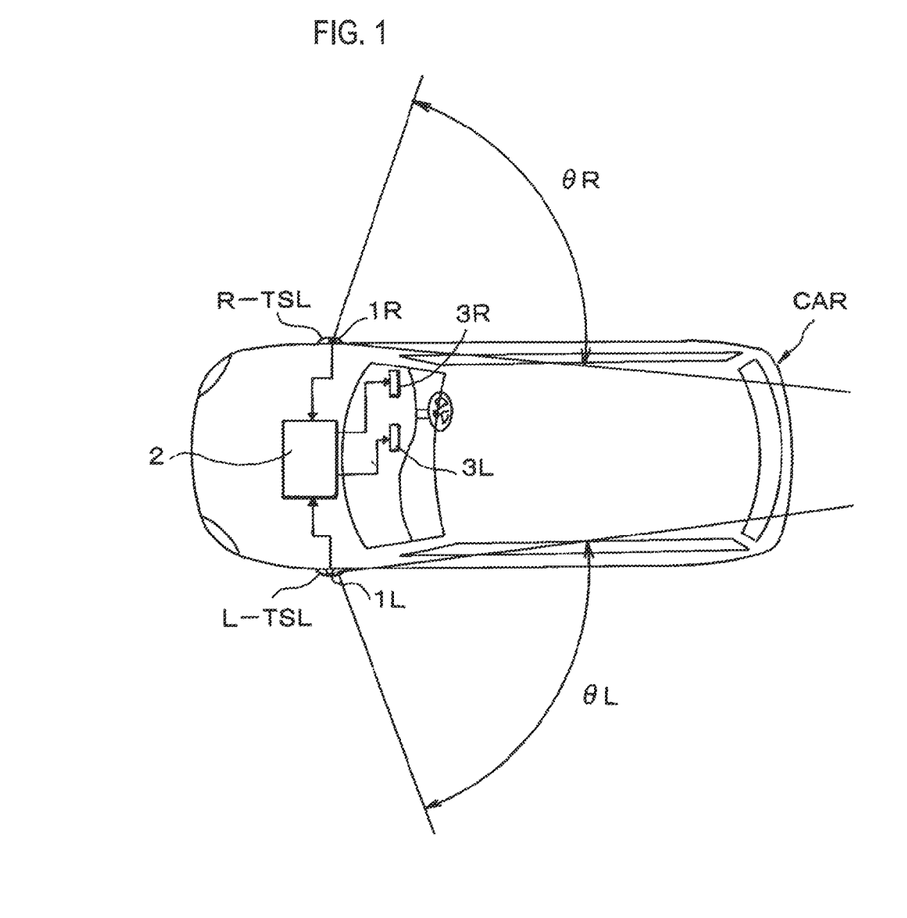
FIG. 1 is a plan view depicting a conceptual configuration of an automobile having a vehicle exterior observation device of the present invention.

Hereinafter, illustrative embodiments of the present invention will be described with reference to the drawings. FIG. 1 is a schematic view of an illustrative embodiment where the present invention is not configured as left and right side-view mirrors of an automobile but configured as a vehicle exterior observation device configured to capture rear and side areas (hereinafter, referred to as rear side areas) of the left and right of the automobile and to display the captured images on a monitor. A left side turn signal lamp L-TSL and a right side turn signal lamp R-TSL are disposed at left and right front fenders of the automobile CAR. The side turn signal lamps L-TSL, R-TSL blink and indicate a traveling direction of the automobile when a turn signal from a driver seat or the like is received and a lighting state is made. The side turn signal lamps are also used as hazard lamps.

In a lamp housing of each of the side turn signal lamps L-TSL, R-TSL, a small camera module 1L (left imaging device) and a camera module 1R (right imaging device) are respectively incorporated. By the camera modules 1L, 1R, it is possible to capture the rear side areas of the automobile CAR, which are denoted with reference numerals θL, θR in FIG. 1. Herein, the right camera module 1R incorporated into the right side turn signal lamp R-TSL of the automobile is configured to capture the right rear side angle area θR of the automobile CAR and the left camera module 1L incorporated into the left side turn signal lamp L-TSL is configured to capture the left rear side angle area θL of the automobile CAR.

A dashboard in a vehicle interior of the automobile CAR is disposed thereon with monitors, which are configured to display images captured with the left and right camera modules 1R, 1L. Herein, the right monitor 3R and the left monitor 3L are disposed side by side at positions of the dashboard facing the driver seat. For display of the left and right monitors 3L, 3R, the automobile CAR is provided with an image ECU (electronic control unit) 2 configured to serve as an image control unit. The images captured with the left and right camera modules 1L, 1R are image-processed in the image ECU 2 and are then displayed on the left and right monitors 3L, 3R.

In the illustrative embodiment, the image captured with the right camera module 1R is displayed on the right monitor 3R, and the image captured with the left camera module 1L is displayed on the left monitor 3L. Although the display form is described later, a driver can observe the rear side areas of the automobile by seeing the images on the left and right monitors 3L, 3R, like the related art where the driver can observe the rear side areas of the automobile by the left and right side-view mirrors. Therefore, the automobile CAR is not provided with the side-view mirrors.

Figure 2:
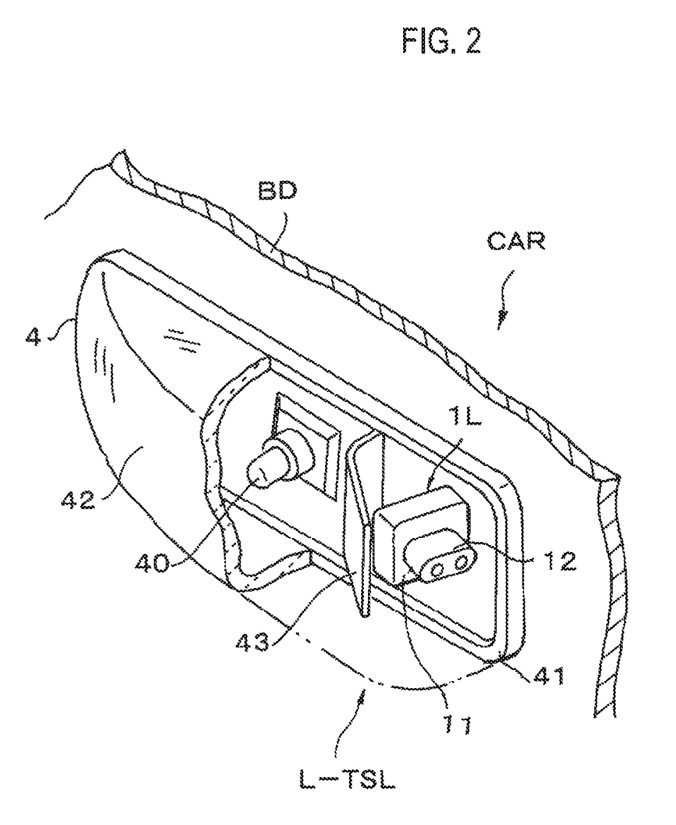
FIG. 2 is a partially broken perspective view of a left turn signal lamp.

FIG. 2 is a partially broken perspective view of the left side turn signal lamp L-TSL of the automobile CAR. The left side turn signal lamp L-TSL has a housing 4 configured by a base 41 fixed to a vehicle body BD of the automobile CAR, herein, to a left front fender, and a dome-shaped translucent cover 42 configured to cover a surface becoming an inner surface of the base 41 and fixed to the base 41. A bulb (small electric bulb) or LED (light emitting diode) configured to serve as a light source 40 is mounted on the inner surface of the base 41 in the lamp housing 4. Herein, a discrete-type LED 40 is mounted. Also, the left camera module 1L of which an imaging optical axis faces rearward is embedded at a position in the lamp housing 4 facing the rear side of the automobile CAR, and is supported on the inner surface of the base 41. Also, a light shielding plate 43 for preventing light emitted from the light source (LED) 40 from going around the camera module 1L to badly influence an image to be captured is embedded in the lamp housing 4.

The translucent cover 42 of the lamp housing 4 is formed of a translucent resin, a rear area of the left camera module 1L is configured as a clear part configured not to refract or diffuse the light, and the other area serving as a light emission surface is formed with an optical step for refracting or diffusing the light emitted from the light source 40 toward a predetermined area. In the meantime, the light emission surface of the translucent cover 42 may be colored by an amber color. The right side turn signal lamp R-TSL is symmetrically configured to the left side turn signal lamp.

Figure 3A:
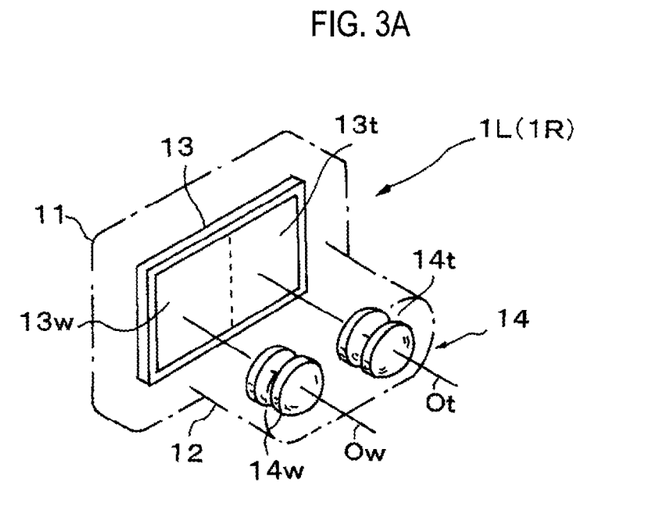
FIG. 3A and FIG. 3B are pictorial perspective views illustrating an internal configuration of a left camera module and a configuration view of an optical system illustrating an imaging area.

FIG. 3A is a pictorial configuration view illustrating an internal structure of the left camera module 1L. The left camera module has a camera body 11 and a lens tube 12. One imaging element 13 is embedded in the camera body 11, and a lens system 14 is embedded in the lens tube 12. The imaging element 13 is configured by a semiconductor imaging element such as a CCD imaging element, a CMOS imaging element or the like. Although not described in detail, the imaging element 13 has an imaging surface on which a plurality of imaging pixels is arranged in a matrix shape, and is configured to capture a target by light-receiving an optical image of the target, which is image-produced on the imaging surface by the lens system 14, with the respective imaging pixels. The imaging surface of the imaging element 13 has a rectangular shape of which a predetermined aspect ratio is horizontally long, and is substantially perpendicular to a tube axis direction of the lens tube 12, i.e., an imaging optical axis of the lens system 14.

Herein, the lens system 14 in the lens tube 12 is configured by a first lens system 14t (first image-producing optical system) and a second lens system 14w (second image-producing optical system) of which imaging optical axes (optical axes passing through centers of the lens systems) Ot, Ow face toward a more slightly outer side in a vehicle width direction than the rear of the automobile CAR. The first lens system 14t and the second lens system 14w are disposed side by side in the vehicle width direction, and are respectively configured to image-produce optical images in different areas on the imaging surface of the imaging element 13. Herein, the first lens system 14t is disposed at a more inner side in the vehicle width direction of the automobile CAR than the second lens system 14w, i.e., at a side closer to the vehicle body BD, and the second lens system 14w is disposed at an outer side of the side. In the meantime, each lens system shown indicates a single lens or a lens group having a plurality of combined lenses.

The optical image image-produced with the first lens system 14t is image-produced and captured in a first area 13t corresponding to about an inner half of the imaging surface of the imaging element 13 in the vehicle width direction. Also, the optical image image-produced with the second lens system 14w is image-produced and captured in a second area 13w corresponding to about an outer half of the imaging surface of the imaging element 13 in the vehicle width direction. Thereby, the imaging element 13 can capture the optical images, which are respectively image-produced by the first lens system 14t and the second lens system 14w, at the same time.

Figure 3B:
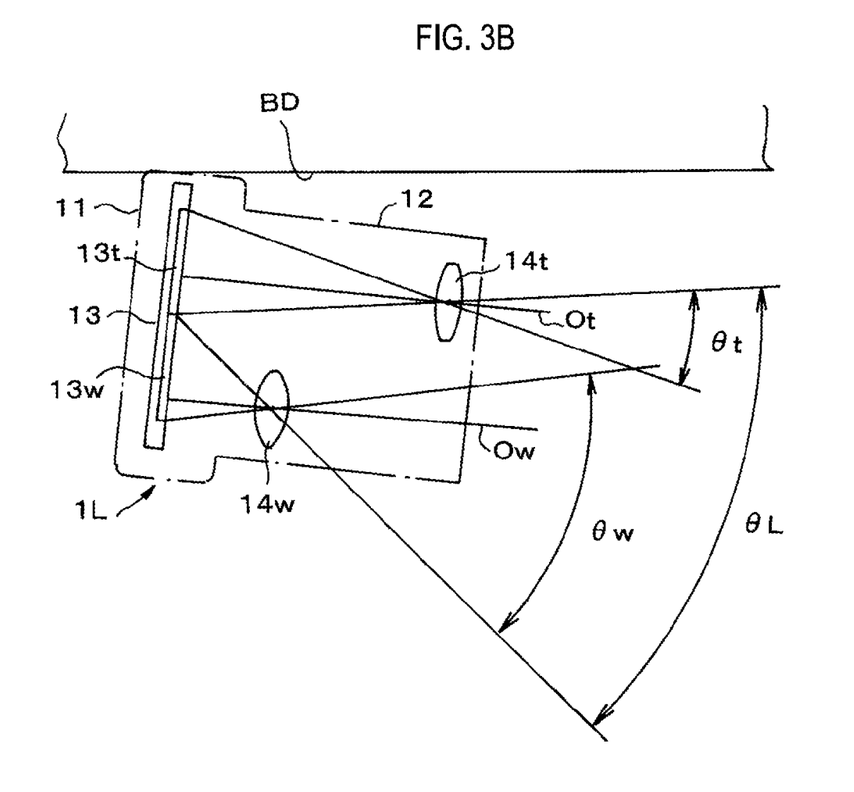

FIG. 3B is a configuration plan view for illustrating the imaging element 13 and the optical systems of the first and second lens systems 14t, 14w. Although the first lens system 14t and the second lens system 14w have substantially the same basic configuration, a focusing distance of the first lens system 14t is designed to be greater than a focusing distance of the second lens system 14w. Therefore, hereinafter, the first lens system 14t is referred to as a tele (telephoto) lens system, and the second lens system 14w is referred to as a wide (wide angle) lens system.

In general, an imaging view angle upon imaging by a lens system is determined by a focusing distance of the lens system and a size of an imaging surface. In the illustrative embodiment, however, the first area 13t and the second area 13w made by bisecting the imaging surface of the imaging element 13 have substantially the same sizes in a left-right direction. Therefore, an imaging view angle θt of the tele lens system 14t is narrower than an imaging view angle θw of the wide lens system 14w. For example, the imaging view angle θt of the tele lens system 14t is set to about 30°, and the imaging view angle θw of the wide lens system 14w is set to about 70°. Meanwhile, in the illustrative embodiment, the optical axes Ot, Ow of the lens systems 14t, 14w are made to deviate outward in the vehicle width direction with respect to the centers of the imaging surfaces 13t, 13w. Therefore, the imaging view angles θt, θw of the lens systems 14t, 14w become view angles that are greater at the outer side than at the inner side of the vehicle width direction. The tele lens system 14t is disposed to face the first area 13t, and the wide lens system 14w is disposed to face the second area 13w.

Also, since the focusing distance of the tele lens system 14t is greater than the focusing distance of the wide lens system 14w, a first imaging magnification of the tele lens system 14t is greater than a second imaging magnification of the wide lens system 14w. Also, since the first area 13t and the second area 13w of the imaging surfaces of the tele lens system 14t and the wide lens system 14w are arranged side by side in the left-right direction, the imaging area of the tele lens system 14t and the imaging area of the wide lens system 14w partially overlap with each other. Also, an entire imaging view angle of the camera module 11, having combined the tele lens system 14t and the wide lens system 14w is a view angle θL shown in FIG. 1. This is also the same for the right camera module 1R.

The image ECU 2 shown in FIG. 1 can perform processing such as image processing, for example, zooming-in, zooming-out, distortion correction, trimming, synthesis and the like for the image captured with the imaging element 13. Herein, the zooming-in and the zooming-out include processing of independently increasing or decreasing vertical and horizontal sizes of an image, i.e., changing an aspect ratio of an image, too. Since the image processing can be implemented by software (program), the specific descriptions of the software are herein omitted.

Figure 4:
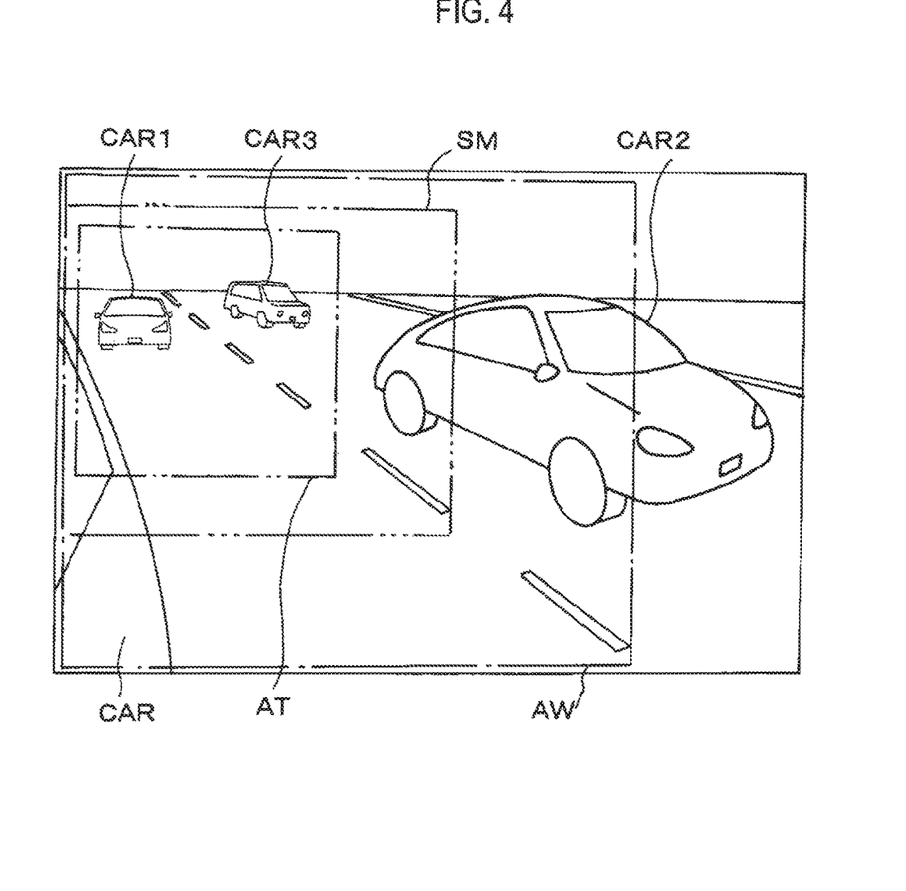
FIG. 4 is a pictorial view depicting a relation between an example of an exterior area of the automobile and imaging areas of a tele lens system and a wide lens system.

Subsequently, display operations on the monitors 3R, 3L by the vehicle exterior observation device of the illustrative embodiment are described. FIG. 4 depicts a left rear area as seen from an own vehicle CAR in a situation where a following vehicle CAR1 travels on an own traffic lane at the rear of the own vehicle CAR and a parallel traveling vehicle CAR2 and a rear vehicle CAR3 travel on a left traffic lane. In this situation, when an image is captured with the left camera module 1L, an area (first imaging area) denoted with a reference numeral AT is captured by the tele lens system 14t and the imaging element 13, and an area (second imaging area) denoted with a reference numeral AW is captured by the wide lens system 14w and the imaging element 13. In the meantime, an area SM is an area that can be visibly recognized by a left side-view mirror if the left side-view mirror is mounted to the automobile.

Figure 5A:
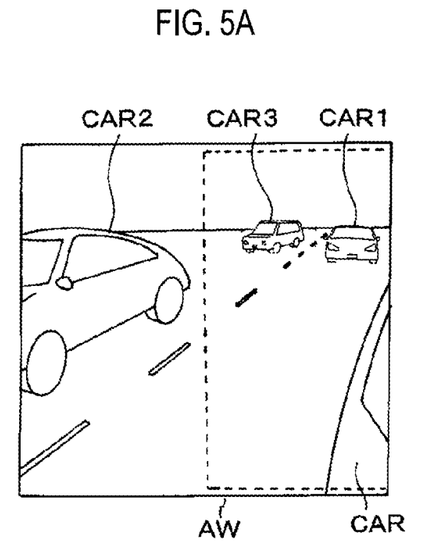
FIG. 5A, FIG. 5B and FIG. 5C depict captured images of the exterior area of FIG. 4 and a display image thereof.
Figure 5B:
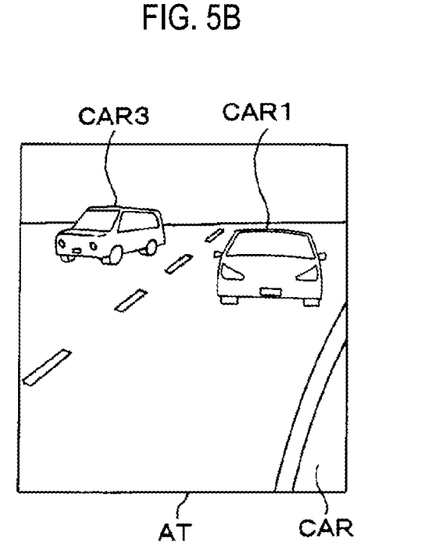

FIGS. 5A and 5B indicate an image (hereinafter, referred to as a tele image AT) obtained by capturing the area AT with the tele lens system 14t and an image (hereinafter, referred to as a wide image AW) obtained by capturing the area AW with the wide lens system 14w, which are mirror-reversed so as to display the same on the monitor 3L. The tele image AT (first image) is an image of a rear area of the own vehicle CAR, in which the area is narrower than the area visibly recognized by the left side-view mirror but the following vehicle CAR1 and the rear vehicle CAR3 are captured with being zoomed in. The wide image AW (second image) is an image of a wide area of a rear side of the own vehicle CAR, in which the imaging area is wider than the area visibly recognized by the left side-view mirror and the following vehicle CAR1, the parallel traveling vehicle CAR2 and the rear vehicle CAR3 are all captured.

When the images are respectively introduced, the image ECU 2 performs image recognition for each of the tele image AT and the wide image AW and detects an overlapping part, in which both the images are captured with being overlapped, i.e., a common image that is commonly captured in both the images AT, AW. Then, the image ECU deletes the common image from one image. Herein, the common image is deleted from the wide image AW of which the imaging view angle is greater. At this time, since an image captured in a more inner area of the vehicle width direction than the common image has a great possibility that it will be captured by the right camera module 1R, it may be deleted together with the common image. Also, the common image is deleted over an entire area of the upper-lower direction thereof. In this example, an area surrounded by the broken line is deleted from the wide image AW of FIG. 5A.

Meanwhile, actually, the optical axes and the imaging view angles of the tele lens system 14t and the wide lens system 14w are preset and the imaging area overlapping in both the lens systems, i.e., the overlapping part of the present invention can be known in advance. Therefore, only an image, which does not overlap in both the lens systems, of the images captured with the respective lens systems may be selected from the beginning, without detecting and deleting the common image.

Figure 5C:
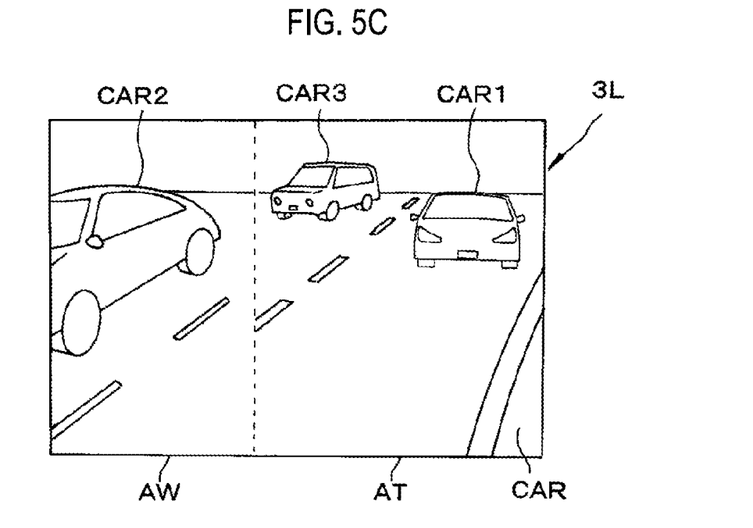

Then, as shown in FIG. 5C, the ECU 2 arranges the tele image AT and the wide image AW obtained by deleting the common image side by side in the left-right direction and displays the same on the left monitor 3L. On the left monitor 3L, the tele image AT is displayed in a substantial right half area of a display surface and the wide image AW is displayed in a left half area. At this time, since the common image to the tele image AT has been deleted from the displayed wide image AW and both the images AT, AW are displayed side by side in the left-right direction with being continuous to each other, it is possible to display the wide area of the rear side areas of the own vehicle in succession without a dead zone by the tele image AT and the wide image AW, so that it is possible to favorably observe the rear side areas.

Also, upon the display on the left monitor 31, the following vehicle CAR1 and the rear vehicle CAR3, which are to be visually recognized small on a normal side-view mirror, are captured and displayed as an image having a higher magnification by the tele image AT. Therefore, the following vehicle CAR1 and the rear vehicle CAR3 can be observed as a zoomed-in image having a higher resolution, so that correct observation can be made. In the meantime, since the side area in which a dead zone occurs on the normal side-view mirror is displayed as a wide angle image by the wide image AW, it is possible to observe the parallel traveling vehicle CAR2 next to the own vehicle without any dead zone. The above is also the same for the right camera module 1R and the right monitor 3R, hut the left-right direction is opposite to the above. Also, it is possible to particularly observe an opposite vehicle, which exists in a right side area, on the right monitor 3R.

In the illustrative embodiment, in the display forms of the tele image and the wide image on the monitor, since the imaging magnifications of the tele image and the wide image are different, an observer may feel uncomfortable. Therefore, for example, a configuration may be possible in which the display magnification of the tele image or the wide image is appropriately adjusted by a person who observes the monitor. That is, the display magnification of the wide image may be increased so that the wide image is displayed as a size close to the imaging magnification of the tele image. Alternatively, the display magnification of the tele image may be decreased so that the tele image is displayed with being reduced to a size close to the imaging magnification of the wide image.

In this way, the tele image and the wide image can be displayed on the monitors with the difference between the magnifications thereof being reduced, so that the sense of discomfort, which is caused due to the difference between the imaging magnifications, is removed. For example, when it is thought that it is necessary to correctly observe the other vehicles including the following vehicle as a large image, the wide image is displayed with being zoomed in, as described in the former. Also, when it is thought that it is necessary to observe a wide range of the rear side areas of the own vehicle, the tele image is displayed with being zoomed out, as described in the latter.

Figure 6A:
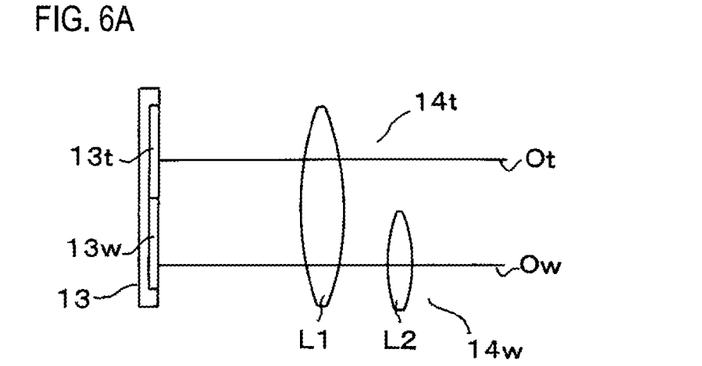
FIG. 6A and FIG. 6B are configuration views of an optical system according to a modified example of the lens system of the camera module.

FIG. 6 is a pictorial configuration view of a modified example of the camera module, and depicts an example of the left camera module 1L, like FIG. 3B. In FIG. 6A, the tele lens system 14t has a configuration where one area of one main lens L1 is used, and the wide lens system 14w has a configuration where another area of the main lens L1 is used and a sub-lens L2 is combined thereto. Thereby, since the focusing distance of the tele lens system 14t becomes greater than the focusing distance of the wide lens system 14w, the imaging magnification of the tele lens system 14t becomes greater than the imaging magnification of the wide lens system 14w. On the other hand, the imaging view angle of the wide lens system 14w becomes greater than the imaging view angle of the tele lens system 14t.

Figure 6B:
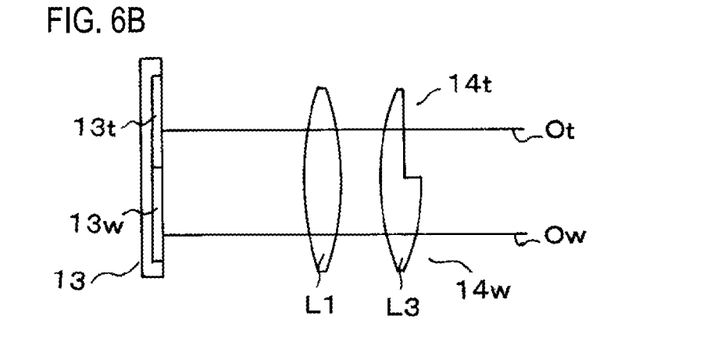

In FIG. 6B, an aspheric lens is used as the sub-lens L3 that is to be combined with the main lens L1 of FIG. 6A. In the aspheric lens, one side of the lens surface is a biconvex lens, and the other side of the lens surface is a single convex lens. The tele lens system 14t has a configuration where the single convex lens area of the sub-lens L3 is used, and the wide lens system 14w has a configuration where the biconvex lens area of the sub-lens L3 is used. Thereby, since the focusing distance of the tele lens system 14t becomes greater than the focusing distance of the wide lens system 14w, the imaging view angle of the wide lens system 14w is made greater than the imaging view angle of the tele lens system 14t.

Figure 7:
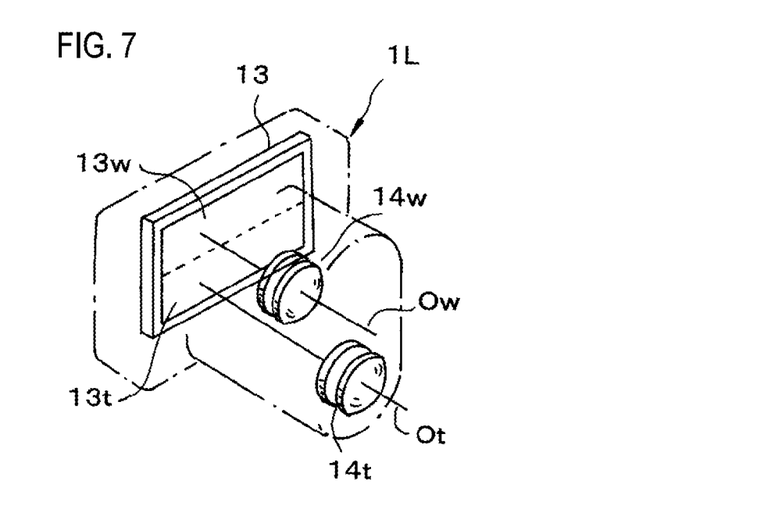
FIG. 7 is a pictorial perspective view of another illustrative embodiment of the left camera module.

In the meantime, the camera modules of the vehicle exterior observation device of the present invention are provided to observe the other vehicles, pedestrians and the like in the own vehicle surrounding of the rear side areas of the automobile. Therefore, it is preferably to set the imaging view angle in the horizontal direction wider than the imaging view angle in the vertical direction. FIG. 7 is a pictorial perspective view of the camera module 1L of an illustrative embodiment configured to conform this object, in which the tele lens system 14t and the wide lens system 14w are vertically disposed on the imaging surface of the imaging element 13, an optical image, which is to be image-produced on the imaging surface of the imaging element 13 having a horizontally long rectangular shape by the tele lens system 14t, is to be captured in the first area 13t, which corresponds to about a lower half of the imaging surface, and an optical image, which is to be image-produced by the wide lens system 14w, is to be captured in the second area 13w, which corresponds to about an upper half of the imaging surface.

Figure 8:
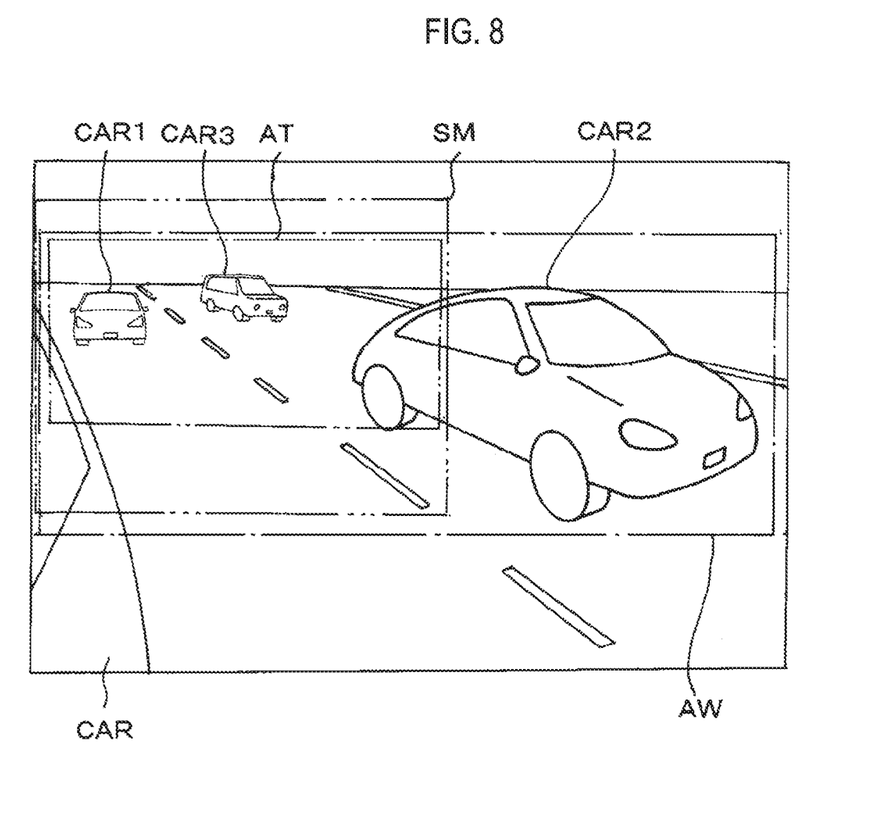
FIG. 8 is a pictorial view depicting a relation between an example of the exterior area of the automobile and imaging areas of the tele lens system and the wide lens system.

In this configuration, when capturing a situation of the rear side areas of the own vehicle as shown in FIG. 8, the areas AT, AW close to the horizontally long flat shape are captured as the tele image and the wide image, respectively, as shown with the dashed-dotted lines in FIG. 8. A reference numeral SM indicates a visibly recognizable area by a side-view mirror. Thereby, it is possible to capture a very wide area ranging from the rear to the side of the automobile by increasing the imaging view angles in the left-right direction (horizontal direction) of the tele lens system 14t and the wide lens system 14w.

Figure 9A:
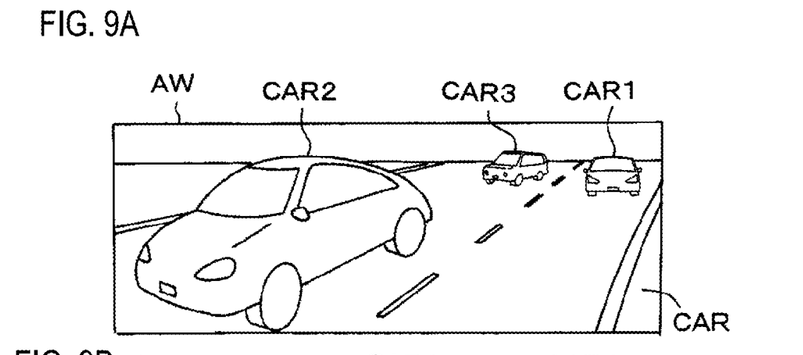
FIG. 9A, FIG. 9B and FIG. 9C depict captured images of the exterior area of FIG. 8 and a display image thereof.
Figure 9B:
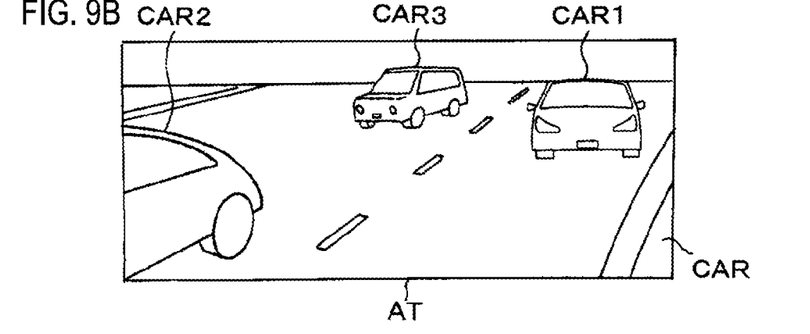
Figure 9C:
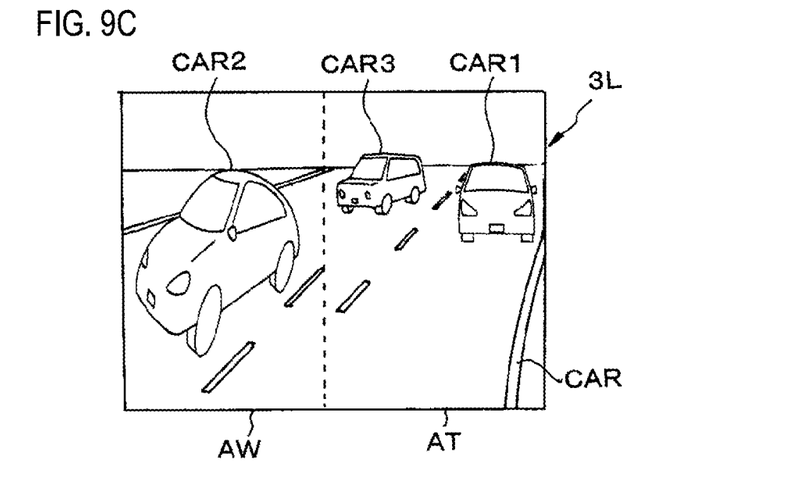

That is, FIG. 9A depicts a wide image AW captured by the wide lens system 14w, and FIG. 9B depicts a tele image AT captured by the tele lens system 14t, both of which are mirror-reversed so as to display the same on the monitor. The wide image AW can be captured as an image of a considerably wider area than the visibly recognizable area SM of the side-view mirror, and the tele image AT can be captured as an image in which an area including the visibly recognizable area SM of the side-view mirror is zoomed in. Therefore, as shown in FIG. 9C, it is possible to display the left wide area of the rear side areas of the own vehicle by synthesizing the wide image AW and the tele image AT in the image ECU 2, in the same manner as the illustrative embodiment, and displaying the synthesized image on the left monitor 3L. In this case, the tele image AT and the wide image AW are respectively zoomed out in the left-right direction due to the size in the left-right direction of the monitor. For this reason, the other vehicles in the displayed image are displayed with being deformed. However, since the display magnification and the display areas are kept as they are, it is possible to display the wide area of the rear side area of the own vehicle in succession without a dead zone, so that it is possible to favorably observe the rear side areas.

Like this, even when the tele lens system 14t and the wide lens system 14w are vertically disposed, if the focusing distances of the tele lens system 14l and the wide lens system 14w are made different and the imaging view angles and the imaging magnifications of the respective lens systems can be thus made different, the respective lens systems can be made to have the lens configuration as shown in the drawings.

In the camera module 1L of the illustrative embodiment, when the lens tube 12 is made to face toward the rear of the automobile, the imaging surface of the imaging element 13 in the camera body 11 faces toward the rear of the automobile. For this reason, as shown in FIG. 2, it is necessary to set a size in the vehicle width direction of the lamp housing 4 having the camera module 1L embedded therein greater than a size in the left-right direction of the camera module 1L, i.e., a size in the left-right direction of the imaging element 13. In order to reduce the size of the lamp housing 4, the camera module of an illustrative embodiment as described below has a configuration where the imaging surface of the imaging element is substantially parallel with the tube axis of the lens tube.

Figure 10:
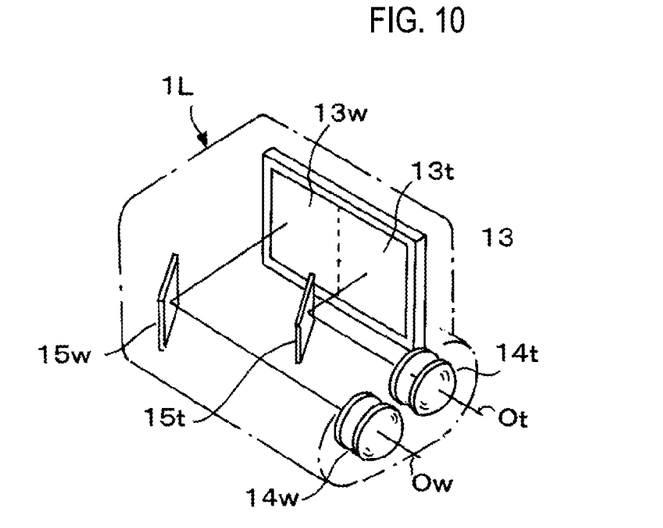
FIG. 10 is a pictorial perspective view of still another illustrative embodiment of the left camera module.

FIG. 10 is a pictorial perspective view of the camera module 1L configured in this manner. The tele lens system 14t and the wide lens system 14w are disposed so that the optical axes Ot, Ow face toward the front-rear direction of the automobile but the imaging surfaces 13t, 13w of the imaging element 13 are disposed to face toward the vehicle width direction of the automobile. In this manner, the respective optical axes Ot, Ow are inclined relative to normal directions of the imaging surfaces 13t, 13w. Also, a mirror 15t (first optical unit) and a mirror 15w (a second optical unit) for optical reflection are respectively provided on the respective optical axes Ot, Ow of the tele lens system 14t and the wide lens system 14w. In particular, the mirror 15t is provided on a first light path between the tele lens system 14t and the imaging surface 13t and is configured to change a propagation direction of light that is to be propagated along the first light path. The mirror 15w is provided on a second light path between the wide lens system 14w and the imaging surface 13w and is configured to change a propagation direction of light that is to be propagated along the second light path.

By the above configuration, when the camera module is mounted on the automobile, the imaging surface of the imaging element 13 is disposed along the front-rear direction of the automobile, so that it is possible to provide a thin type of the camera module 1L of which a size in the vehicle width direction is reduced. Therefore, as shown in FIG. 2, it is possible to implement the thinning of the side turn signal lamp L-TSL by reducing the size in the vehicle width direction of the lamp housing 4 of the side turn signal lamp L-TSL having the camera module 1L embedded therein. In this way, it is possible to reduce the size in the vehicle width direction of the vehicle body of the automobile.

Figure 11A:
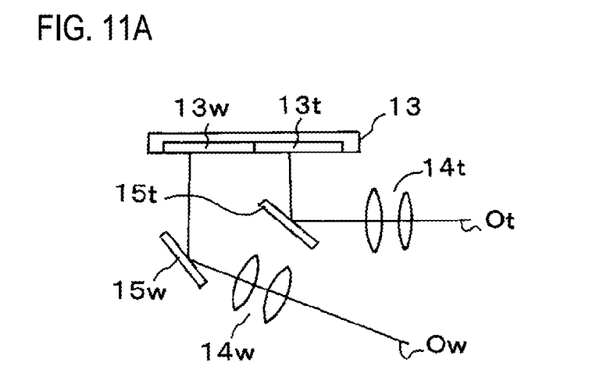
FIG. 11A and FIG. 11B are configuration views of an optical system according to a modified example of the lens system of the camera module.

FIG. 11A and FIG. 11B are configuration views is a configuration view of an optical system in a modified example of the camera module shown in FIG. 10. In FIG. 11A, angle positions of reflective surfaces of the mirrors 15t, 15w respectively provided for the lens systems 14t, 14w are made different, so that the directions of the optical axes Ot, Ow of the tele lens system 14t and the wide lens system 14w are made different. That is, the angle position of the mirror 15w, which is provided for the wide lens system 14w, relative to the vehicle width direction is made greater than the angle position of the mirror 15t, which is provided for the tele lens system 14t, relative to the vehicle width direction, so that the optical axis Ow of the wide lens system 14w is made to face toward the more outer side in the vehicle width direction than the optical axis Ot of the tele lens system 14t.

Thereby, it is possible to further widen the imaging area of the wide lens system 14w having the greater imaging view angle to the side area of the automobile. Also, the overlapping area of the imaging area of the tele lens system 14t and the imaging area of the wide lens system 14w is reduced to remarkably widen the entire imaging area of the camera module.

Figure 11B:
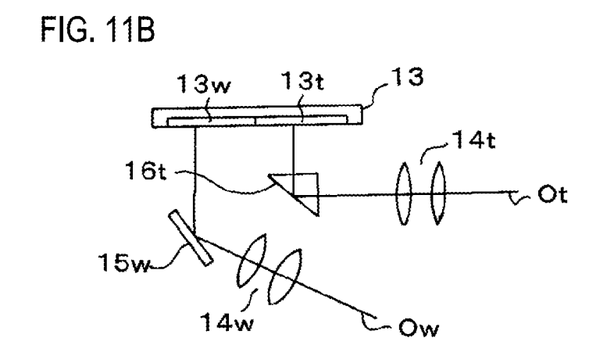

FIG. 11B depicts a configuration where the mirror provided for the tele lens system 14t is replaced with a right angle prism 16t and an inclined surface of the right angle prism 16t is configured as a reflective surface. Also in the configuration, the angle positions of the reflective surfaces of the mirror 15w and the right angle prism 16t are appropriately adjusted to make the directions of the imaging optical axes Ot, Ow of the tele lens system 14t and the wide lens system 14w different.

Also, in the camera module where the imaging surface of the imaging element 13 is made to face toward the vehicle width direction of the automobile, the imaging surface may be vertically divided to capture the optical images that are to be image-produced by the tele lens system and the wide lens system. In this case, the tele lens system and the wide lens system are disposed in the vertical direction.

In the above illustrative embodiment, the example of the camera modules that are disposed on the left and right surfaces of the vehicle body of the automobile and are configured to capture the areas from the rear to the sides of the left and right of the automobile has been described. However, an imaging device that is disposed at a rear part of the vehicle body of the automobile and is configured to capture the rear of the automobile over a wide area in the left-right direction may also be adopted. In this case, the tele lens system having a long focusing distance is configured to capture an area just behind the own vehicle and the wide lens system having a short focusing distance is configured to capture a wide rear area in the left-right direction. Thereby, the following vehicle, which travels just behind the own vehicle, is captured with being zoomed in, so that it is possible to make the observation for prevention of a rear-end collision and to securely observe the vehicles that are traveling at one side or both sides of the own vehicle and exist in the dead zones of the side-view mirrors.

In the illustrative embodiment, the example where the respective images captured with the first lens system (tele lens system) and the second lens system (wide lens system) are synthesized in succession in the left-right direction has been described. However, the upper and lower different areas may also be captured with the first lens system and the second lens system, depending on the exterior situations to be observed. In this case, the image control unit may be configured to synthesize the respective images in succession in the upper-lower direction and to display the synthesized image on the monitor.

The image-producing optical system of the imaging device provided for the vehicle exterior observation device of the present invention is not limited to the lens system configured by only the single lens or the plurality of lenses described in the illustrative embodiment. For example, the image-producing optical system of the imaging device may be an optical system including the optical elements such as a reflecting mirror having an image-producing function, the above-described mirror or prism, and the like. Also, the image-producing optical system is not limited to the two systems as described in the illustrative embodiment, and may be three or more systems. In this case, all of three images may be synthesized or two or more images may be selected and synthesized and then the synthesized image may be displayed on the monitor. Also, when synthesizing the plurality of images as a successive image, it is not necessarily required to delete the entire common image. That is, the images may be synthesized with a part of the common image being overlapped inasmuch as an image to be displayed on the monitor does not cause a sense of discomfort.

Also, in the above illustrative embodiment, the one image ECU is configured to display the images captured with the left and right camera modules on the left and right monitors. However, an independent image ECU may be respectively embedded in the left and right monitors, and respective images captured with the left and right camera modules may be independently image-processed in the respective image ECUs and then displayed on the respective monitors.

Also, the monitors may be configured as one monitor, and images captured with the left and right camera modules may be displayed side by side on the display surface of the monitor.

The contents of Japanese Patent Application Nos. 2014-110738 and 2014-110739 filed on May 29, 2014, which configure a part of the descriptions of the subject application, are incorporated herein by reference.

INDUSTRIAL APPLICABILITY

The present invention can be used for the vehicle exterior observation device configured to capture and observe the wide area of the vehicle exterior.

The invention claimed is:

1. A vehicle exterior observation device comprising:
an imaging device comprising:
an imaging element having an imaging surface;
a first image-producing optical system configured to form, on the imaging surface, a first image of a first imaging area of a vehicle exterior at a first imaging magnification; and
a second image-producing optical system configured to form, on the imaging surface, a second image of a second imaging area of the vehicle exterior at a second imaging magnification different from the first imaging magnification, and
an image control unit configured:
to detect the first imaging area and the second imaging area;
to synthesize the first image and the second image to form a first displayed image and a second displayed image, respectively, on the basis of the detected first imaging area and second imaging area so that the first displayed image and the second displayed image are displayed in succession; and
to display the first displayed image and the second displayed image on a monitor,
wherein an area displayed by the first displayed image and the second displayed image is continuous,
wherein at least part of the first displayed image is not provided on the second displayed image, and
wherein at least part of the second displayed image is not provided on the first displayed image.

2. A vehicle exterior observation device comprising:
an imaging device comprising:
an imaging element having an imaging surface;
a first image-producing optical system configured to form, on the imaging surface, a first image of a first imaging area of a vehicle exterior at a first imaging magnification, and
a second image-producing optical system configured to form, on the imaging surface, a second image of a second imaging area of the vehicle exterior at a second imaging magnification different from the first imaging magnification, and
an image control unit configured:
to detect the first imaging area and the second imaging area,
to synthesize the first image and the second image on the basis of the detected first imaging area and second imaging area so that the first image and the second image are displayed in succession, and
to display the synthesized image on a monitor
wherein the image control unit is configured to synthesize the first image and the second image by detecting a common image of the first image and the second image and deleting the detected common image from any one image of the first image and the second image.

3. The vehicle exterior observation device according to claim 2, wherein the image control unit is configured to synthesize the first image and the second image so that the first image and the second image are displayed in succession with being parallel with each other in a left-right or upper-lower direction.

4. The vehicle exterior observation device according to claim 1, wherein the image control unit is configured to synthesize the first image and the second image by image-processing at least one image of the first image and the second image.

5. The vehicle exterior observation device according to claim 4, wherein the image control unit is configured to zoom in or zoom out the at least one image.

6. The vehicle exterior observation device according to claim 1, wherein a focusing distance of the first image-producing optical system is greater than a focusing distance of the second image-producing optical system, wherein the first imaging area is an inner area in a vehicle width direction, wherein the second imaging area is an outer area in the vehicle width direction, and wherein the image control unit is configured to synthesize the first image and the second image so that the first displayed image and the second displayed image are displayed in succession with being parallel with each other in a left-right direction.

7. The vehicle exterior observation device according to claim 6, wherein the imaging device has a left imaging device disposed at a left side of the vehicle and a right imaging device disposed at a right side of the vehicle, and wherein an image obtained by the left imaging device and an image obtained by the right imaging device are to be displayed on separate monitors or on a single monitor.

8. An imaging device provided for a vehicle exterior observation device configured to observe a vehicle exterior on the basis of an image of the vehicle exterior, the imaging device comprising:
an imaging element having an imaging surface;
a first image-producing optical system configured to form, on the imaging surface, a first image of a first imaging area of the vehicle exterior at a first imaging magnifications; and a second image-producing optical system configured to form, on the imaging surface, a second image of a second imaging area of the vehicle exterior at a second imaging magnification different from the first imaging magnification, wherein all or part of the first image is displayed in a monitor as a first displayed image, wherein all or part of the second image is displayed on the monitor as a second displayed image, wherein area displayed by the first displayed image and the second displayed image is continuous, wherein at least part of the first displayed image is not provided on the second displayed image, and wherein at least part of the second displayed image is not provided on the first displayed image.

9. The imaging device according to claim 8, wherein a focusing distance of the first image-producing optical system is different from a focusing distance of the second image-producing optical system.

10. The imaging device according to claim 8, wherein the first imaging area and the second imaging area are in contact with each other or partially overlap with each other.

11. The imaging device according to claim 8, wherein the imaging surface of the imaging element has a first area and a second area parallel with each other in a horizontal or vertical direction, and wherein the first image-producing optical system is disposed to face the first area and the second image-producing optical system is disposed to face the second area.

12. The imaging device according to claim 8, wherein an optical axis of the first image-producing optical system is configured to face toward a direction different from an optical axis of the second image-producing optical system.

13. An imaging device provided for a vehicle exterior observation device configured to observe a vehicle exterior on the basis of an image of the vehicle exterior, the imaging device comprising:

an imaging element having an imaging surface;

a first image-producing optical system configured to form, on the imaging surface, a first image of a first imaging area of the vehicle exterior at a first imaging magnification; and a second image-producing optical system configured to form, on the imaging surface, a second image of a second imaging area of the vehicle exterior at a second imaging magnification different from the first imaging magnification, wherein an optical axis of the first image-producing optical system and an optical axis of the second image-producing optical system are respectively inclined relative to a normal direction of the imaging surface, and wherein the imaging device further comprises:

a first optical unit provided on a first light path between the first image-producing optical system and the imaging surface and configured to change a propagation direction of light to be propagated along the first light path, and a second optical unit provided on a second light path between the second image-producing optical system and the imaging surface and configured to change a propagation direction of light to be propagated along the second light path.

\* \* \* \* \*